US012759169B2

(12) United States Patent
Zimmer et al.

(10) Patent No.: US 12,759,169 B2
(45) Date of Patent: Oct. 13, 2026

(54) SELF-RETAINING GRIPPING DEVICE

(71) Applicants: Martin Zimmer, Rheinau (DE); Günther Zimmer, Rheinau (DE)

(72) Inventors: Martin Zimmer, Rheinau (DE); Günther Zimmer, Rheinau (DE)

( * ) Notice: Subject to any disclaimer, the term of this patent is extended or adjusted under 35 U.S.C. 154(b) by 143 days.

(21) Appl. No.: 18/697,455

(22) PCT Filed: Sep. 29, 2022

(86) PCT No.: PCT/DE2022/000100
§ 371 (c)(1),
(2) Date: Jul. 1, 2024

(87) PCT Pub. No.: WO2023/051854
PCT Pub. Date: Apr. 6, 2023

(65) Prior Publication Data
US 2024/0399594 A1 Dec. 5, 2024

(30) Foreign Application Priority Data
Sep. 30, 2021 (DE) ..................... 10 2021 004 914.4

(51) Int. Cl.
*B25J 15/02* (2006.01)
*B25J 13/08* (2006.01)
(Continued)

(52) U.S. Cl.
CPC ........... *B25J 15/026* (2013.01); *B25J 13/088* (2013.01); *B25J 15/086* (2013.01); *B25J 19/0004* (2013.01)

(58) Field of Classification Search
CPC ...... B25J 15/026; B25J 13/088; B25J 15/086; B25J 19/0004; B25J 9/00; B25J 9/16;
(Continued)

(56) References Cited

U.S. PATENT DOCUMENTS

2008/0181757 A1* 7/2008 Wheeler .............. B25J 19/0004
414/815
2017/0320216 A1* 11/2017 Strauss ................ B25J 15/0028
(Continued)

FOREIGN PATENT DOCUMENTS

CN 207953858 U * 10/2018
DE 3910801 A1 10/1990
(Continued)

OTHER PUBLICATIONS

Nguyen et al., "Gravity Compensation Design of Planar Articulated Robotic Arms Using the Gear-Spring Modules," Jun. 2020 (Year: 2020).*

(Continued)

*Primary Examiner* — Adam R Mott
*Assistant Examiner* — Byron Xavier Kasper
(74) *Attorney, Agent, or Firm* — Smartpat PLC

(57) ABSTRACT

A gripping device includes a drive motor with a motor-current-monitoring or pressure-monitoring system, and a gear unit which can be driven by the drive motor. The gear unit has a worm gear stage driven by a rotatable gear shaft, which worm gear stage is coupled to at least one of at least two gripping element carriers which are movable relative to one another. A holding brake for blocking the gear shafts is arranged in a housing of the gripping device. The worm gear stage has a screw that is axially slidable towards at least one spring energy accumulator, so that, upon an increase in the flank pressure on the respective gripping pressure flank of the screw, the loading on one of these spring energy accumulators increases. The drive motor is so relieved of load in a gripping device in spite of a high gripping force.

13 Claims, 6 Drawing Sheets

(51) Int. Cl.
*B25J 15/08* (2006.01)
*B25J 19/00* (2006.01)

(58) Field of Classification Search
CPC ........ B25J 15/00; B25J 9/1612; B25J 9/1653; B25J 15/0213; B25J 15/0246
See application file for complete search history.

(56) References Cited

U.S. PATENT DOCUMENTS

| | | | | |
|---|---|---|---|---|
| 2018/0313442 | A1* | 11/2018 | Ning | F16H 55/06 |
| 2021/0113241 | A1* | 4/2021 | Forster | A61B 17/3468 |
| 2021/0138667 | A1* | 5/2021 | Kassow | B25J 9/126 |
| 2021/0362336 | A1* | 11/2021 | Muneto | B25J 9/1651 |
| 2022/0253019 | A1* | 8/2022 | Ortell | G05B 9/02 |

FOREIGN PATENT DOCUMENTS

| | | | | | |
|---|---|---|---|---|---|
| DE | 102004003677 | A1 | * | 8/2005 | H02K 7/1025 |
| DE | 102015012779 | A1 | | 4/2017 | |
| DE | 102017001220 | A1 | * | 8/2018 | B25J 15/00 |
| EP | 0924583 | A2 | * | 6/1999 | G01L 5/28 |
| EP | 3260248 | A1 | * | 12/2017 | B25J 19/0004 |
| EP | 3360654 | A1 | | 8/2018 | |

OTHER PUBLICATIONS

Yu, (CN 207953858 U English translation) "A Micro-clutch Structure and a Mechanical Arm of the Clutch Structure," Oct. 12, 2018 (Year: 2018).*

* cited by examiner

SELF-RETAINING GRIPPING DEVICE

CROSS-REFERENCE TO RELATED APPLICATION

This application is a national stage application, filed under 35 U.S.C. § 371, of International Patent Application PCT/DE2022/000100, filed on Sep. 29, 2022, which claims the benefit of German Patent Application DE 10 2021 004 914.4, filed on Sep. 30, 2021.

TECHNICAL FIELD

The disclosure relates to a gripping device comprising a drive motor having a motor-current-monitoring or pressure-monitoring system, and a gear unit that can be driven the drive motor.

BACKGROUND

A gripping device is known from DE 10 2015 012 779 A1.

SUMMARY

A gripping device comprises a drive motor having a motor-current-monitoring or pressure-monitoring system, and a gear unit that can be driven by means of the drive motor. The gear unit has a worm gear stage driven by at least one rotatable gear shaft, which worm gear stage is coupled to at least one of at least two gripping element carriers that are movable relative to one another. A method for operating such a gripping device comprising at least one gripping element per gripper carriage and an item to be gripped is also disclosed.

The present disclosure solves the problem of relieving the load on the drive motor in spite of the high gripping force of the gripping device.

This problem is solved with the features of the main claim. For this purpose, a holding brake for blocking at least one of the specified gear shafts is arranged in a housing of the gripping device. The worm gear stage has a screw that is axially slidable towards at least one spring energy accumulator, so that, upon an increase in the flank pressure on the respective gripping pressure flank of the screw, the loading on one of these spring energy accumulators increases.

Upon operation of the gripping device, the gripping elements are pressed against the item to be gripped by means of the gripping device with the holding brake released until the motor-current-monitoring system or pressure-monitoring system reaches a predetermined value. The flank pressure of the gripping pressure flank of the screw increases and the screw is slid in the axial direction under load of the spring energy accumulator. The holding brake is engaged and the drive motor is switched off.

The screw of the worm gear stage is moved axially against a spring energy accumulator to ensure the gripping force. Thereby, the spring energy accumulator is loaded. Once the predetermined gripping force has been reached, the part of the gear unit between the drive motor and the worm gear stage is blocked. This is effected by means of a releasable holding brake supported on the housing of the gripping device, which locks one of the gear shafts in place with a force fit. After the engagement of the holding brake, the drive motor can be switched off.

In order to set down an item to be gripped picked up by means of the gripping device, the holding brake is released and the drive motor is driven in the opposite direction.

The gripping device can be readjusted if the gripping force is reduced due to the item to be gripped. Thereby, initially, the gripping element carriers are moved in the gripping direction while relieving the spring energy accumulator. Such movement is detected by means of a distance or angle measuring system, whereupon the drive motor is switched on again and the holding brake is released. The drive motor is now operated until the provided gripping force is reached again.

Further details of the invention are given in the subclaims and the following description of schematically shown embodiments.

DETAILED DESCRIPTION

Figure 1:
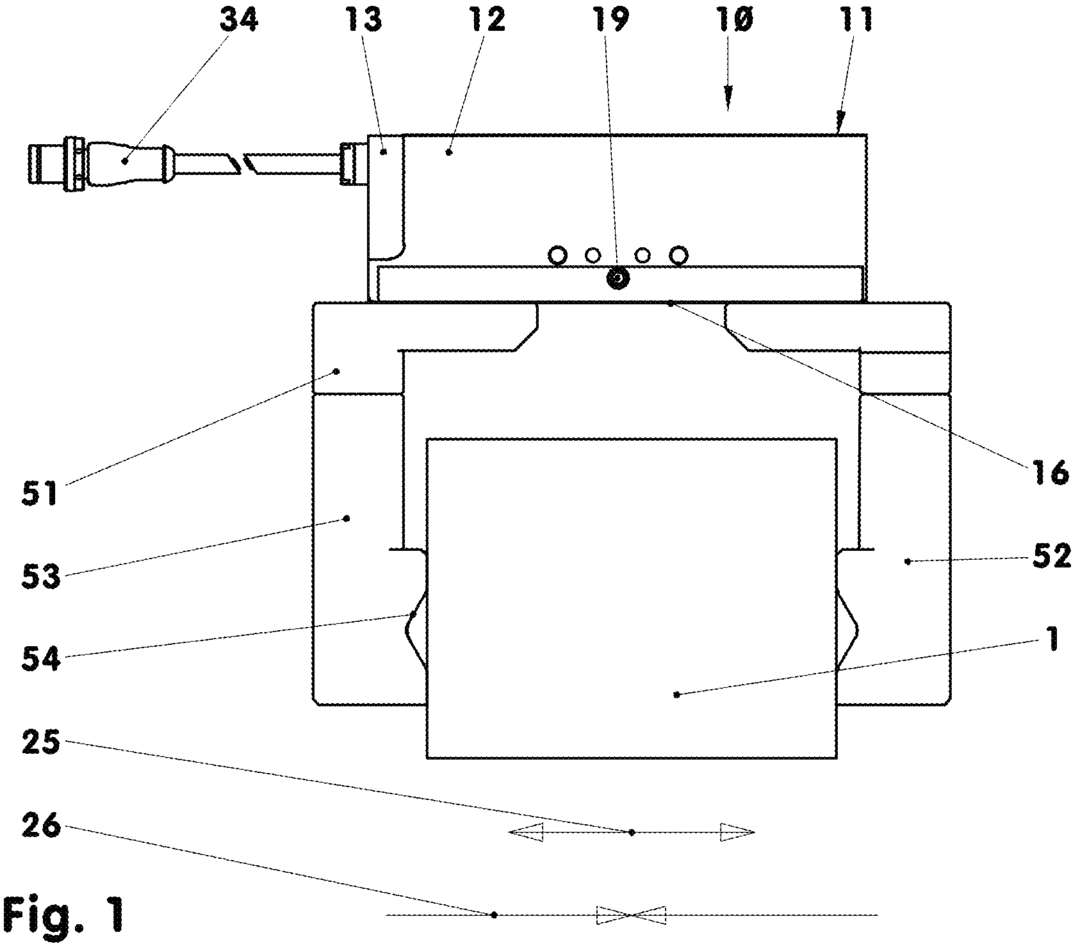
FIG. 1: Gripping device with workpiece.

FIG. 1 shows a gripping device (10) in the design of a parallel gripping device. In this gripping device (10), for example, two gripping elements (51, 52) can be moved relative to one another by means of gripping element carriers (41, 42), see FIG. 2. In the exemplary embodiment, both gripper element carriers (41, 42) are designed as gripper carriages (41, 42) movably mounted in the housing (11). However, it is also conceivable to arrange a gripping element carrier (41; 42) rigidly. The gripping device (10) can also have more than three gripping element carriers (41, 42) that are movable relative to one another. At least one gripper element (51; 52) is assigned to each gripper carriage (41; 42).

Instead of a parallel gripping device, the gripping device (10) can also be designed as an angular gripping device. In this case, the gripping elements are pivotably mounted in the housing (11), for example. The individual gripper carriages (41; 42) then in each case have a drive pin, for example, which engages in a gripper element offset to its pivot axis. It is also conceivable to design the gripping device (10) as a needle gripper, parallelogram gripper, etc.

The gripping device (10) has a media connection (34), for example an electrical connection. In the exemplary embodiment, this media connection (34) is used to supply power to the gripping device (10) and to control and transmit signals from a higher-level control device to the gripping device (10) and back. The control and/or the signal transmission between the gripping device (10) and the higher-level controller can also be wireless, for example by means of radio transmission. In the case of a pneumatically or hydraulically actuated gripping device (10), the pneumatic or hydraulic medium can be conveyed via such media connection (34) or a separate media connection.

In the exemplary embodiment, the individual gripping element (51; 52) is designed as an L-shaped gripper jaw (51; 52). It has a gripper arm (53) and a gripping surface (54). In the external gripping device shown, the gripping surface (54) is oriented towards the vertical center transverse plane of the gripping device (10). In the exemplary embodiment, each of the gripping surfaces (54) is designed to be U-shaped. The two gripper arms (53) of the gripping device (10) shown are aligned parallel to one another. If the gripping device (10) is designed as an internal gripping device, the respective gripping surface (54) is oriented away from the vertical center transverse plane.

In the representation in FIG. 1, the two gripping elements (51, 52) rest with their gripping surfaces (54) from the outside against an item (1) to be gripped, for example a piece good. For example, both gripping elements (51, 52) hold the item (1) to be gripped with a predetermined contact force specific to the item to be gripped. Such contact force specific to the item to be gripped is selected, for example, to be at least high enough to ensure that the item (1) to be gripped is held securely even with a smooth surface of the item (1) to be gripped and the dynamic loads that occur upon handling. The maximum contact force specific to the item to be gripped results, for example, from the permissible deformation of the item (1) to be gripped upon handling.

When in use, the gripping device (10) can be arranged on an arm of an industrial robot, for example. The individual item (1) to be gripped can then be removed from a magazine, for example, by means of the gripping device (10) and conveyed to a processing station. There, the gripping elements (51, 52) are moved apart again, for example, upon the setting down of the item (1) to be gripped.

Figure 2:
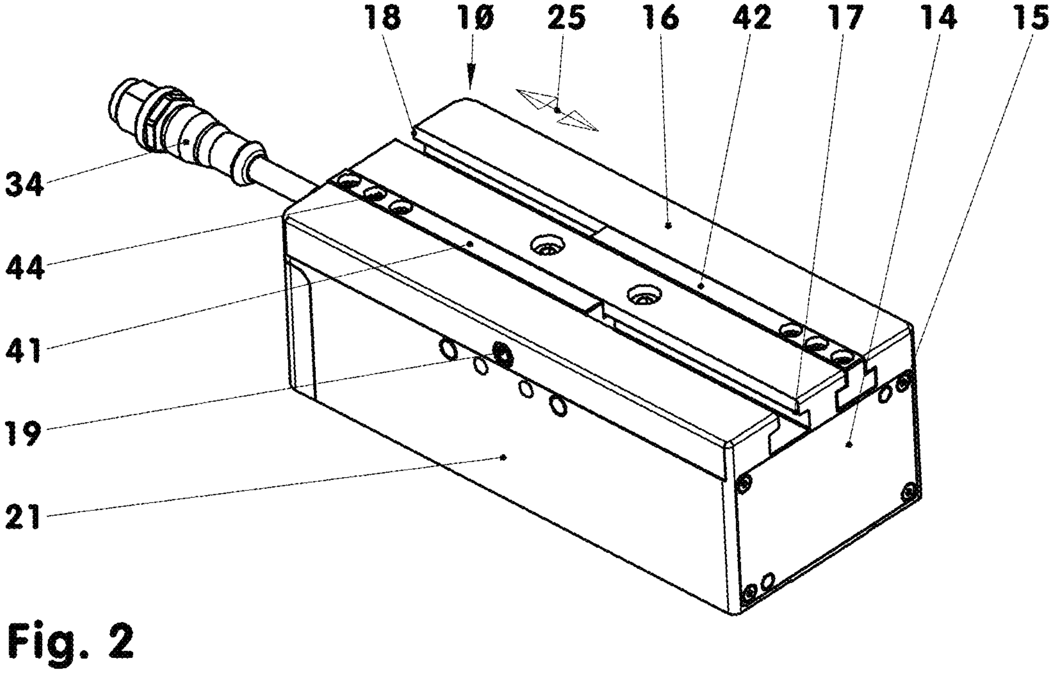
FIG. 2: Isometric bottom view of the gripping device of FIG. 1 without gripping elements.
Figure 3:
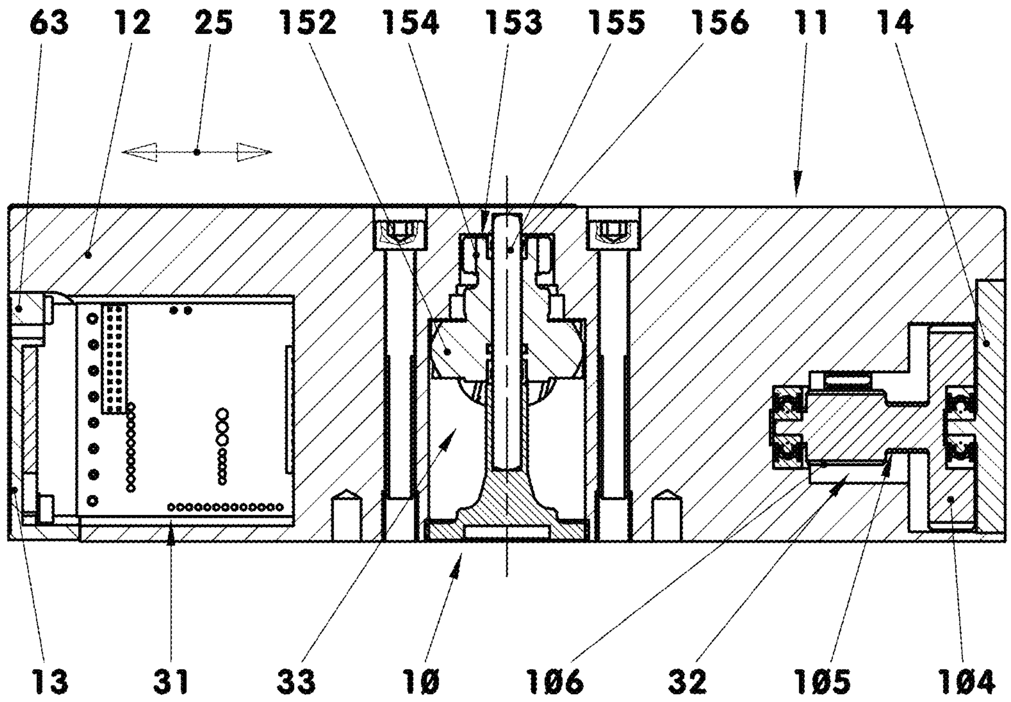
FIG. 3: Longitudinal section of the gripping device.
Figure 4:
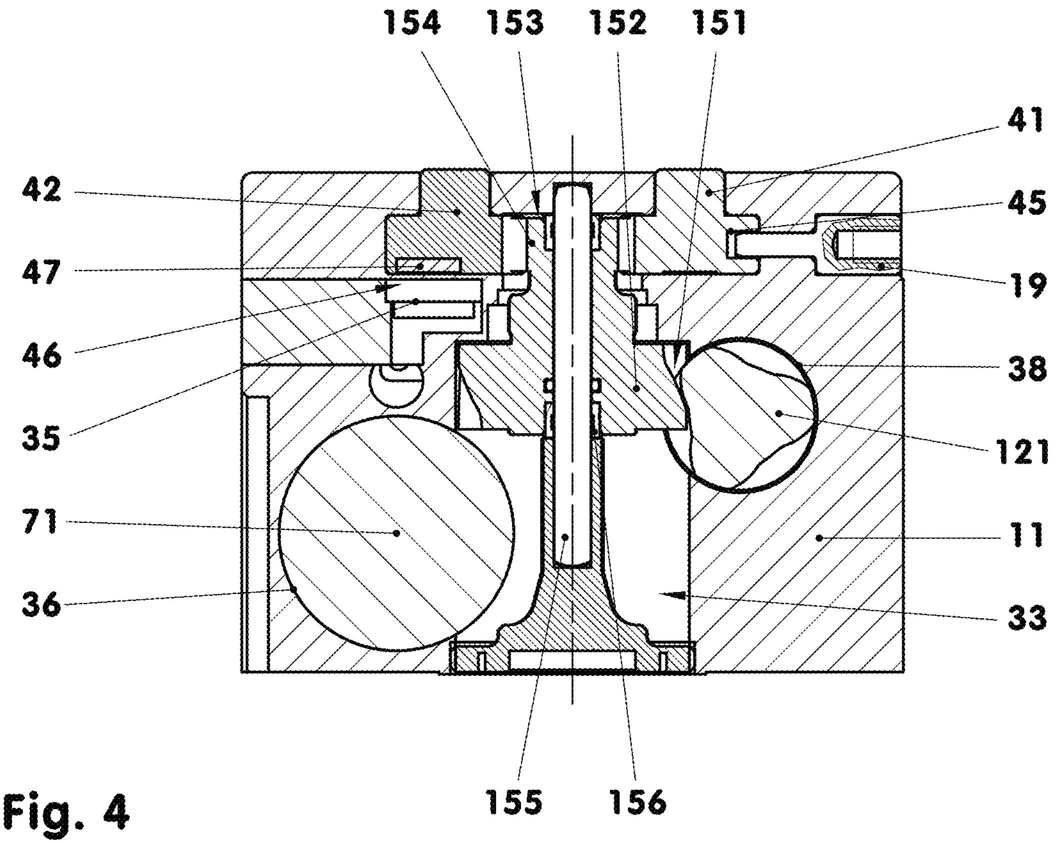
FIG. 4: Cross-section of the gripping device.

FIG. 2 shows the gripping device (10) without the gripping elements (51, 52). FIG. 3 shows a longitudinal section of the gripping device (10). The sectional plane of the representation in FIG. 3 is the vertical center longitudinal plane of the gripping device (10). FIG. 4 shows a cross-section of the gripping device (10), wherein the sectional plane is the vertical center transverse plane.

The housing (11) of the gripping device (10) is designed to be cuboid in shape, for example. For example, it has a length of 140 millimeters, a width of 62 millimeters and a height of 47 millimeters. In the exemplary embodiment, the housing (11) has a central housing base body (12) and a housing cover (13, 14) on each end face. The housing cover (13) on the left-hand side in the representations in FIGS. 1 and 3 delimits an electronics mounting space (31) arranged in the housing (11). The housing cover (14) on the right-hand side, see FIGS. 2 and 3, delimits a gear unit mounting space (32). The two housing covers (13, 14) are fastened to the housing base body (12) by means of countersunk screws (15), for example. A vertically oriented synchronizing gear holder (33) is located in the central region of the housing (11).

On the lower side (16) of the housing (11) pointing upwards in FIGS. 2 and 4, this has two guide grooves (17, 18). The two guide grooves (17, 18) are oriented parallel to one another in the longitudinal direction (25) of the gripping device (10). They are symmetrical to the vertical center longitudinal plane of the gripping device (10). Their center-to-center distance amounts to, for example, 35% of the width of the gripping device (10). Both guide grooves (17, 18) have an identical T-shaped cross-section in the exemplary embodiment. In the central region of the housing (11), the guide grooves (17, 18) intersect the synchronizing gear holder (33).

Figure 5:
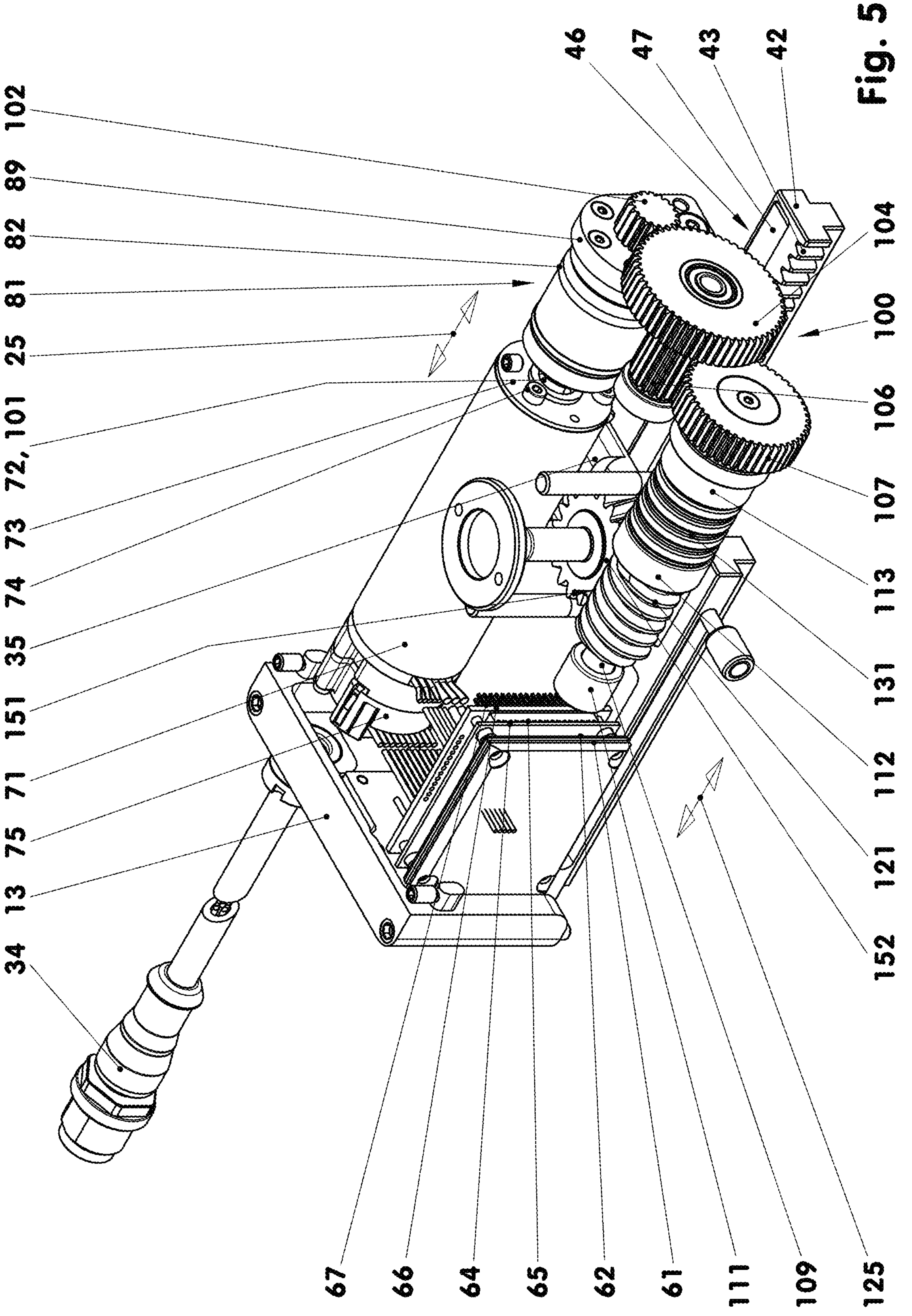
FIG. 5: Gripping device with the housing removed.
Figure 6:
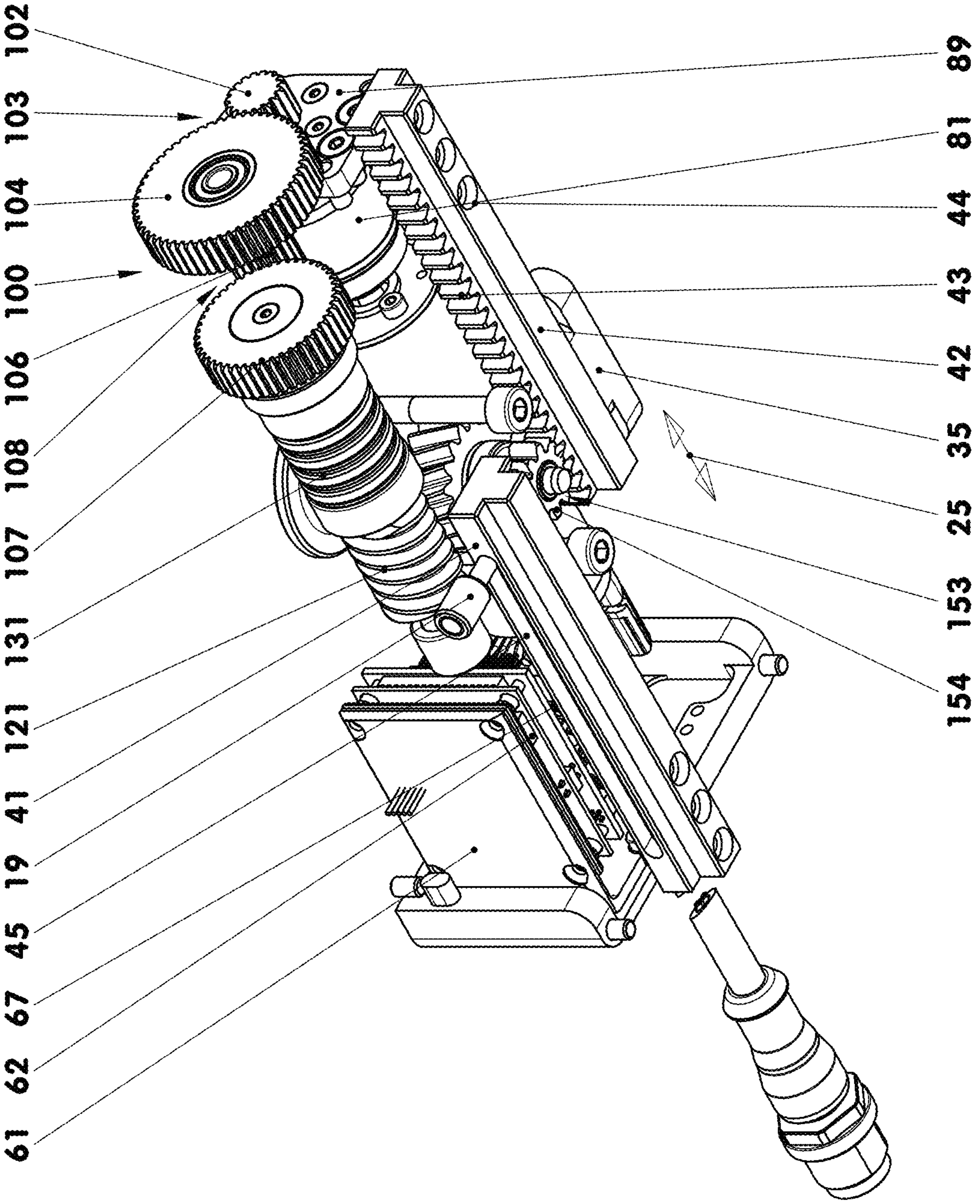
FIG. 6: Bottom view of FIG. 5.

The gripper carriages (41, 42) are guided in the guide grooves (17, 18). The gripper carriages (41, 42) are designed as toothed racks, in each case with a toothing (43), see FIGS. 5 and 6. In the assembled state, the toothing (43) is oriented towards the vertical center longitudinal plane. The individual gripper carriage (41; 42) has fastening holes (44) on the surface facing away from the housing (11). A gripper element (51; 52) is fastened in each case to the fastening holes (44) of a gripper carriage (41; 42). For example, a stop screw (19) screwed into the housing (11) and designed as a countersunk screw (19), which is guided in a longitudinal groove (45) of the gripper carriage (41; 42), is used as a stroke limiter for the individual gripper carriage (41; 42).

In the exemplary embodiment, a position measuring system (46) is arranged on a second gripper carriage (42) and on the housing (11). This comprises, for example, a coded tape (47) arranged on the gripper carriage (42) or a coded rod and a sensor unit (35) arranged on the housing (11). In the exemplary embodiment, a magnetic tape (47) coded on two or more tracks is fastened to the gripper carriage (42). This has a ferrite layer applied to a base carrier, for example. The coding can be designed in the form of a Gray code, for example. The sensor unit (35) has a constant distance to the coded tape (47). For example, it has a plurality of Hall sensors and at least one resistance measuring bridge for scanning and evaluating the coding of the coded tape (47). Instead of such absolute position measuring system (46), a relative position measuring system can also be used, for example. The position measuring system (46) can also be designed as an optical position measuring system.

For example, there is a plurality of assembled circuit boards (61, 64, 66) in the electronics mounting space (31) of the housing (11). For example, a computer and memory module (62) is arranged on a first circuit board (61). This is used, for example, to determine the control values for the gripper drive from a gripper sequence program stored here. During the program sequence, for example, this takes place depending on the actual state of the gripping elements (51, 52). The sequence program starts, for example, after receiving a start signal from a higher-level controller. The circuit board (61) also has, for example, a data interface and externally visible LEDs (63) to indicate the operating state of the gripping device (10).

Figure 7:
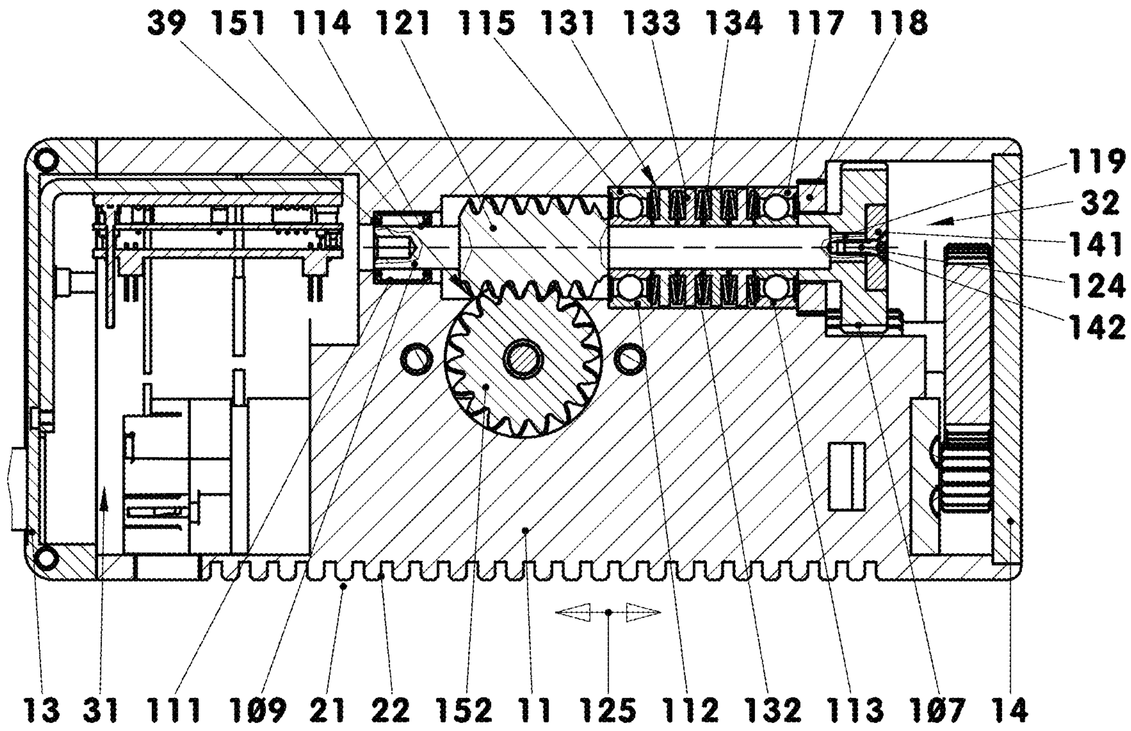
FIG. 7: Longitudinal section of the gripping device along the screw shaft.

The servo controller (65) is housed on a second circuit board (64). It consists of the servo controller CPU and further modules that process the motor signals for cascade controller software. A third circuit board (66) carries the power output stage, whose control electronics are mounted on the second circuit board (64). A motor-current-monitoring system (67), for example, is arranged on such circuit board (66). Cooling fins (22) arranged on the outer side (21) of the housing (11), see FIG. 7, are used to cool the electronic components of the gripping device (10).

A drive motor (71) of the gripping device (10) is seated in a, for example cylindrical, recess (36) in the electronics mounting space (31). The motor shaft (72) of the drive motor (71) projects through an aperture on the base side of the recess (36) into the gear unit mounting space (32). Here, the motor shield (73) is fastened to the housing (11) by means of, for example, three fastening screws (74). The motor shaft (72) is a first gear shaft (101) of a multi-stage gear unit (100) for driving the gripping element carriers (41, 42).

In the exemplary embodiment, the drive motor (71) is a brushless DC servomotor with a rated torque of 59 millinewton meters and a rated power of 133 watts. The rated voltage amounts to 24 volts, for example. The drive motor (71), for example, has a rated speed of 20450 rpm. The diameter of the motor shaft (72) amounts to 4 millimeters, for example. The drive motor (71) has a second shaft end on which a rotary encoder (75), for example in the structural form of a resolver, is seated. The latter has a diametrically magnetized two-pole encoder magnet, for example, which is fastened to the motor shaft (72). An angle sensor for recording the motor shaft position is arranged in the axial direction behind the encoder magnet. The angle sensor comprises electronics with a plurality of Hall sensors, with at least one interpolator and with a plurality of driver stages. The angle-dependent analog magnetic field signal perceived by the Hall sensors is amplified and interpolated so that absolute angle information results. A different structure of the rotary encoder (75) is also conceivable.

A brake unit (81) is seated on the motor shaft (72) in the gear unit mounting space (32). This is secured in the housing (11), for example by means of an anti-rotation lock (89), for example a locking flange (89). In the exemplary embodiment, the locking flange (89) is fastened to the housing (11). The brake unit (81) can also be arranged at the second shaft end of the motor shaft (72).

The brake housing (82) of the brake unit (81) is seated on the motor shaft (72) on rolling bearings. A permanent magnet and an electromagnet are arranged in the brake housing (82). The latter can be controlled by means of electrical lines, for example from the third circuit board (66). A brake disk is seated on the motor shaft (72), which brake disk has at least one magnetizable ferromagnetic coating oriented in the direction of the permanent magnet. Ferromagnetic materials include iron, cobalt, nickel and some alloys. Spring elements in the structural form of release springs are also arranged between the electromagnet and the brake disk. When the electromagnet is de-energized, the permanent magnet attracts the brake disk and thus blocks the motor shaft (72). In order to release the brake unit (81), the electromagnet is energized. The magnetic field of the electromagnet neutralizes the magnetic field of the permanent magnet, so that the release springs increase the distance between the permanent magnet and the brake disk. The motor shaft (72) can now be rotated. Upon the switching off of the electromagnet, the gear shaft is blocked again. Thus, the brake unit (81) forms a holding brake (81) of the gripping device (10).

It is also conceivable that the part of the holding brake (81) that is fixed to the housing has a ring made of a ferromagnetic material. The part of the holding brake (81) on the gear shaft side then carries the permanent magnet. In this case as well, the force of the release springs is directed against the adhesive force of the permanent magnet.

A separable clutch, for example, can be arranged between the drive motor (71) and the brake unit (81) arranged in the gear unit mounting space (32). This allows the movements of the gripper element carriers (41, 42) to be stopped immediately in the event of an emergency stop with simultaneous switching off of the brake release, for example.

A co-rotating drive pinion (102) is seated in the extension of the first gear shaft (101). This is, for example, a straight-toothed spur gear with 17 teeth and a toothing module of 0.5 mm. The toothing of the first gear stage (103) can also be designed to be helical. The counter gear (104) of the first gear stage (103) is seated on an intermediate shaft (105) mounted in the housing (11). In the exemplary embodiment, the intermediate shaft (105) forms a second gear shaft (105). In the exemplary embodiment, the counter gear (104) has 54 teeth. The drive pinion (102) has the same toothing width as the counter gear (104). An intermediate pinion (106) with 19 teeth is also seated on the intermediate shaft (105), which meshes with an output gear (107) arranged on a screw shaft (109). The screw shaft (109) forms a third gear shaft (109) of the gear unit (100). The module of the toothing of the second gear stage (108), for example, matches the toothing module of the first gear stage (103). The intermediate pinion (106) is a straight-toothed spur gear. In the exemplary embodiment, its toothing width amounts to 1.8 times the toothing width of the output gear (107). In the exemplary embodiment, the output gear (107) has 46 teeth. If applicable, the gear unit (100) can also have further gear stages. For example, an additional planetary gear can be connected downstream of the drive motor (71).

In the exemplary embodiment, the length of the screw shaft (109) corresponds to half the length of the gripping device (10). The screw shaft (109) is mounted in the housing (11) by means of three rolling bearings (111-113). All rolling bearings (111-113) are designed as floating bearings. Thereby, in the first rolling bearing (111), the inner ring (114) is seated on the screw shaft (109) so that it can be slid in the axial direction (125). This first rolling bearing (111) is designed as a roller bearing. In the representation in FIG. 7, it lies against the base (39) of the screw shaft recess (38) of the gear unit mounting space (32). The second rolling bearing (112) and the third rolling bearing (113) are designed as deep groove ball bearings. With each of these, the outer ring (115; 117) is mounted so as to be axially slid in the housing (11).

Between the first rolling bearing (111) and the second rolling bearing (112), the screw shaft (109) is designed as a screw (121). It is also conceivable to place the screw (121) on the screw shaft (109). The screw (121) is then secured, for example, both in the axial direction (125) and in the circumferential direction relative to the screw shaft (109). However, the screw (121) can also—with a fixed screw shaft (109) in the axial direction (125)—be arranged so as to be axially slid on the screw shaft (109). In the exemplary embodiment, the axial direction (125) is oriented in the longitudinal direction (25).

The screw (121) is a cylindrical screw. In the exemplary embodiment, it is designed to be single-start and has a left-hand pitch. For example, it can be produced with a straight flank profile in the axial section (ZA screw), with a straight flank profile in the normal section (ZN screw), with involute flanks in the end section (ZI screw), with a crowned flank shape in the axial section (ZK screw) or with a concave flank shape in the axial section (ZC screw).

The screw (121) has a constant pitch. The pitch angle of the screw (121) is the angle enclosed by the flank (122; 123) and a normal plane to the screw rotation axis (124). In the exemplary embodiment, such pitch angle amounts to 13 degrees. The pitch angle can be between 8 degrees and 20 degrees. The axial module of the screw (121) amounts to 1 millimeter, for example. The axial pressure angle of the toothing of the screw (121) amounts to 20 degrees, for example. The axial pressure angle can be between 12 degrees and 25 degrees, for example.

In the exemplary embodiment, the screw (121) together with the screw shaft (109) is made of a thermoplastic material, for example polyoxymethylene (POM). The tensile modulus of elasticity of such material amounts to up to 3200 newtons per square millimeter. Such material has a tensile strength of 65 newtons per square millimeter and a flexural strength of 91 newtons per square millimeter. The specified strength values can be increased by means of glass or carbon fibers.

The material can be processed by injection molding, extrusion, by means of thermal pressing, etc. Subsequent machining is also possible without significantly changing the specified physical properties. The use of other thermoplastics, such as polyetherimide (PEI), polyaryletherketone (PAEK), polyetheretherketone (PEEK), polyetherketoneketone (PEKK), polyphenylene sulphide (PPS), etc. is also conceivable.

The screw shaft (109) and/or the screw (121) can also be made of a steel material that is hardened, for example by means of gas nitriding. The material can also be hardened aluminum. The screw (121) and/or the screw shaft (109) are produced by means of turning or milling, at least in these cases.

The second rolling bearing (112) and the third rolling bearing (113) are seated on a cylindrical section of the screw shaft (109), for example adjacent to the screw (121). The outer ring (117) of the third rolling bearing (113) rests with its side facing away from the second rolling bearing (112) against a support flange (118) fastened in the housing (11).

In the exemplary embodiment, a spring energy accumulator (131) is arranged between the second rolling bearing (112) and the third rolling bearing (113). The spring energy accumulator (131) shown in FIG. 7 has eight disk springs (132), half of which are oriented in the direction of the screw (121) and the other half in the opposite direction. Two disk springs (132) are seated on one guide sleeve (133) each. The individual guide sleeves (133) surround the screw shaft (109) and are spaced apart from one another in the axial direction (125). The spring energy accumulator (131) can also be designed as a disk spring assembly with adjacent disk springs (132), as a helical compression spring, etc. It is also conceivable to use at least one spring energy accumulator (131) with a helical tension spring. This is then arranged between the first rolling bearing (111) and the screw (121), for example.

The shaft end (119) of the screw shaft (109) facing away from the first rolling bearing (111) is designed to be polygon-shaped. The output gear (107) is seated on such shaft end (119). The output gear (107) is secured in the axial direction (125) by means of a pressure disk (141), which is fastened centrally in the screw shaft (109), for example by means of a hexagon socket screw (142).

Together with a screw gear (152), the screw (121) forms a worm gear stage (151) of the gear unit (100). The screw rotation axis (124) of the screw (121) intersects with the axis of the screw gear (152). The two axes do not have an intersection point. In the exemplary embodiment, the screw gear (152) is designed as a helical-toothed spur gear. This is referred to as a non-genuine screw gear (152). It has 18 teeth. The pitch angle of the toothing amounts to 17 degrees, for example. Due to the geometry of the screw (121) and the screw gear (152), there is point contact between the rolling partners of the worm gear stage (151). The screw gear (152) can also be designed as a globoid gear. The worm gear stage (151) is designed to be not self-locking.

The screw gear (152) and a synchronizing gear (154) connected to it form a synchronizing gear unit (153). This is rotatably mounted in the synchronizing gear holder (33) of the housing (11) on a synchronizing gear axle (155) fastened to the housing (11) by means of two rolling bearings (156). Such two rolling bearings (156) are designed as roller bearings in the exemplary embodiment. The synchronizing gear (154) is a straight-toothed spur gear. In the exemplary embodiment, it has ten teeth and a module of one millimeter. The synchronizing gear (154) meshes with the two gripping element carriers (41, 42).

In addition or as an alternative to the position measuring system (46) described above, a position measuring system can be arranged on the screw (121) and on the housing (11). It is also conceivable to arrange an angle measuring system on the synchronizing gear unit (153) and on the housing (11).

A gripper sequence program specific to the item to be gripped is started to operate the gripping device (10), which is arranged on an industrial robot, for example. In this program, for example, whether the gripping task is an external gripping task or an internal gripping task is initially stored. Furthermore, the position of the gripping element carriers (41, 42) relative to one another or relative to the vertical center transverse plane of the gripping device (10) is stored prior to gripping.

After positioning the arm of the industrial robot, the gripping device (10) is positioned, for example, above the item (1) to be picked up. The gripping device (10) is lowered by means of the industrial robot until the gripping elements (51, 52) are level with the end faces of the item (1) to be gripped, for example upon an external gripping task. The holding brake (81) is released. The data stored in the gripper sequence program results in the profile of the lifting speed over time upon the movement of the gripper element carriers (41, 42) relative to one another. The rotation of the motor shaft (72) of the drive motor (71) is transmitted to the worm gear stage (151) by means of the spur gear stages (103, 108). The screw gear (152) is driven by means of the screw (121). The synchronizing gear (154) meshes with the gripper element carriers (41, 42), which are conveyed in opposite directions.

The gripping elements (51, 52) rest against the item (1) to be gripped. Thereby, the motor current requirement of the drive motor (71) increases as the gripping elements (51, 52) are pressed against the item (1) to be gripped. The screw (121) continues to load the screw gear (152) with its gripping pressure flank (122). The respective gripping pressure flank (122) of the screw (121) is the flank that rolls or rests against the screw gear (152) upon the gripping of the item (1) to be gripped. In the external gripping device shown, this is the flank (122) of the screw (121) on the left in the representation in FIG. 8. The position measuring system (46) monitors, for example, the stroke of the gripping element carriers (41, 42).

If the torque of the drive motor (71) is applied continuously, the screw (121) is slid in the axial direction (125) against the spring energy accumulator (131). The disk spring assembly (134) is compressed. The second rolling bearing (112) is slid to the right from the representation of FIG. 7, wherein its outer ring (115) detaches from its contact with the housing (11). As the load on the spring energy accumulator (131) increases, the motor current of the drive motor (71) increases. As soon as the motor-current-monitoring system (67) determines a motor current that reaches or exceeds a threshold value predetermined in the gripper sequence program, the holding brake (81) is engaged. The motor current correlates with the gripping force. Upon the engagement of the holding brake (81), the energization of the electromagnet is switched off in the exemplary embodiment. The permanent magnet attracts the ferromagnetic ring. Thereby, the gear unit (100) is blocked. The drive motor (71) can now be switched off.

If the position measuring system (46) or the angle measuring system is designed as an absolute measuring system, a gripping stroke query can be carried out at such point in time, for example. Upon the engagement of the holding brake (81), either the position of the screw (121) or a gripping element carrier (41, 42) relative to the housing (11) is determined by means of the position measuring system (46) or the position of the synchronizing gear unit (153) relative to the housing (11) is determined by means of the angle measuring system. Such value is stored in the gripper controller either as an absolute value or as a starting value. It is also conceivable to determine the current gripping stroke relative to the initial value when the gripping element carriers (41, 42) are open.

Figure 8:
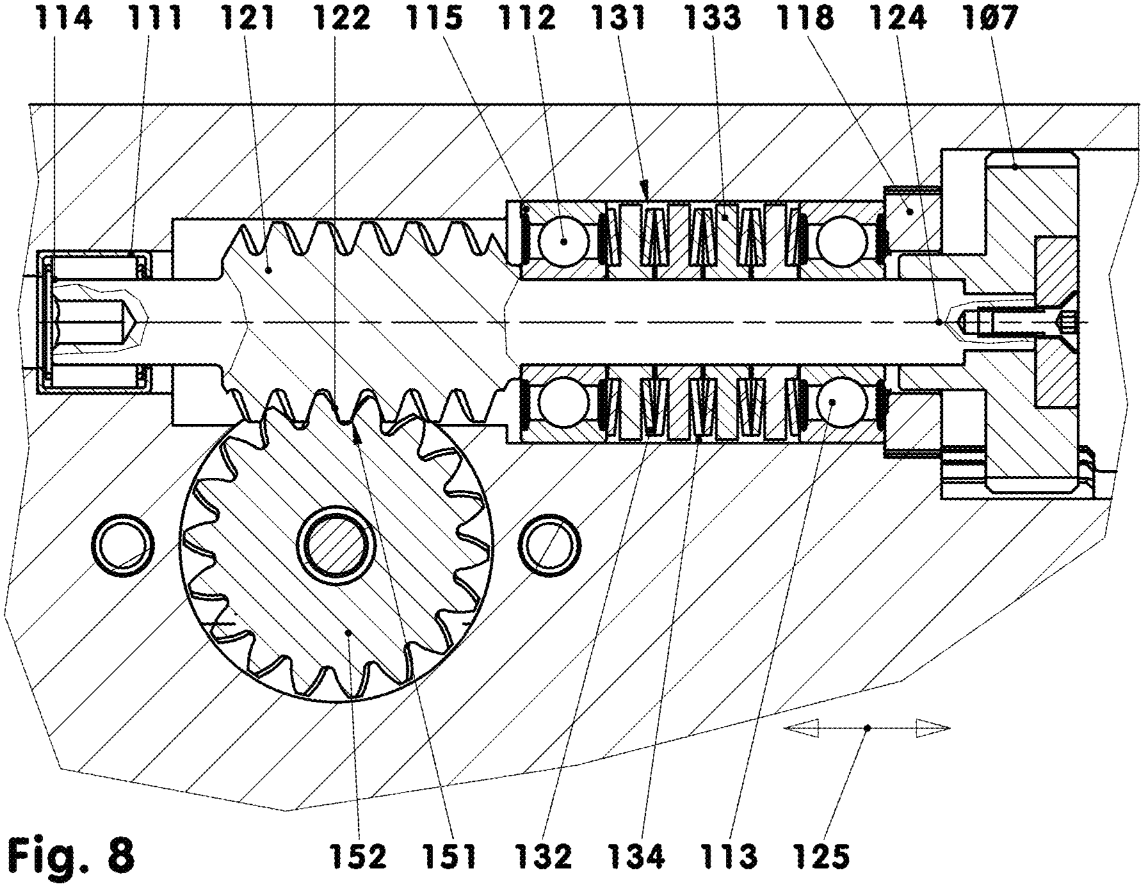
FIG. 8: Screw and loaded spring energy accumulator with target gripping force upon external gripping.

FIG. 8 shows the screw (121) in the gripping device (10) of the exemplary embodiment, axially slid under load on the spring energy accumulator (131). The second rolling bearing (112) is slid in the direction of the third rolling bearing (113) by means of the screw shaft (109). The guide sleeves (133) rest against one another, for example.

If the item (1) to be gripped deforms elastically or plastically under the effect of the contact force of the gripping elements (51, 52), the contact resistance acting on the gripper jaws (51, 52) is reduced. The spring energy accumulator (131) is relieved and slides the screw (121) so that the load on its gripping pressure flank (122; 123) increases again. The screw (121) rolls on the screw gear (152), which is rotated about the synchronizing gear axle (155). The synchronizing gear (154) connected to the screw gear (152) slides the two gripping element carriers (41, 42) in the engagement direction (26) of the gripping device (10). Thereby, for example, a change in the position of the gripping element carrier (41; 42) is recognized by means of the position measuring system (46). The drive motor (71) is switched on by means of the gripping device's own controller, for example. The electromagnet of the holding brake (81) is also energized. The holding brake (81) is released. By means of the drive motor (71), the gripping element carriers (41, 42) are now moved further in the engagement direction (26) until the motor current reaches the predetermined value again. The holding brake (81) is engaged again and the drive motor (71) is switched off.

If the gripping device (10) is used for an internal gripping task, the gripping element carriers (41, 42) move in the direction away from the vertical center transverse plane upon the gripping of the gripping device (10). Upon the engagement of such gripping device (10), the screw (121) rotates in the direction of rotation opposite to the external gripping. The gripping pressure flank (123) of the screw (121) upon internal gripping is the flank on the left in FIG. 9. The synchronizing gear unit (153) rotates counterclockwise upon the engagement of the inner gripping unit in the representation of FIG. 6.

As the contact force on the item (1) to be gripped increases, the screw (121) together with the screw shaft (109) is slid to the left relative to the housing (11) from the position shown in FIG. 7. In this case as well, the distance between the second rolling bearing (112) and the third rolling bearing (113) is reduced.

Figure 9:
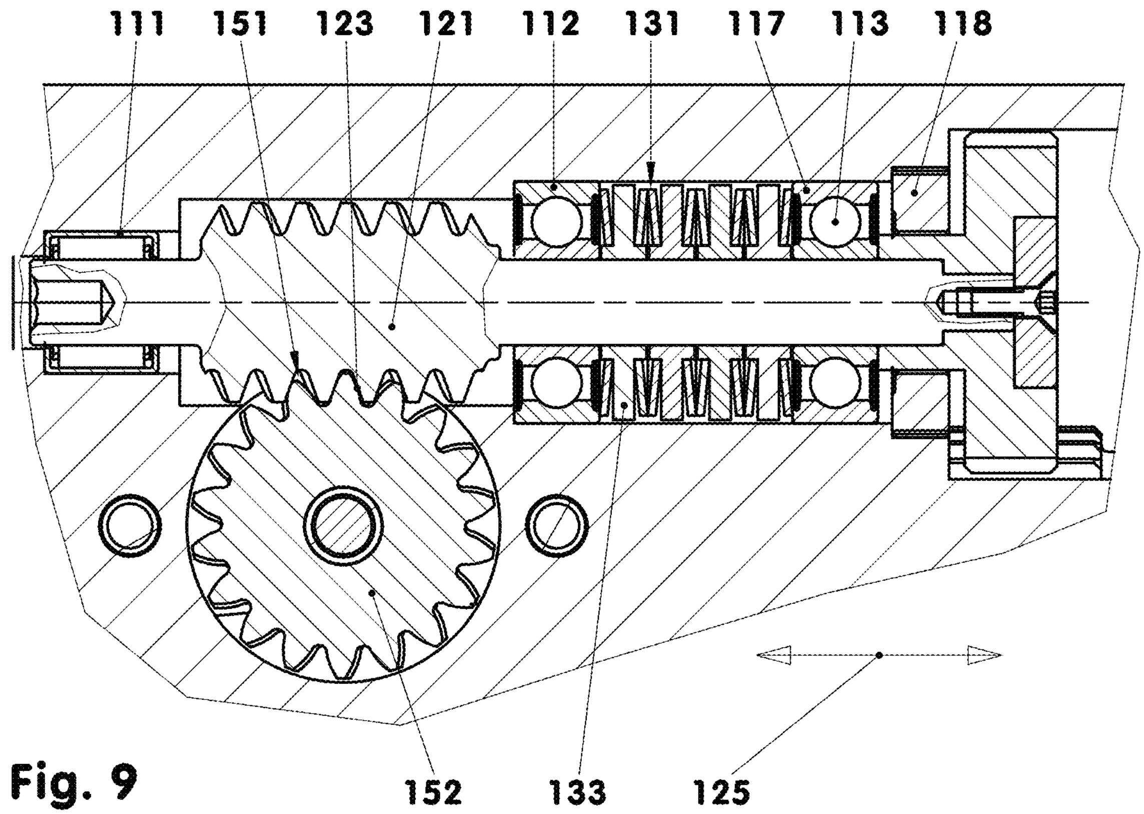
FIG. 9: Screw and loaded spring energy accumulator with target gripping force upon internal gripping.

FIG. 9 shows the screw (121) axially slid under load on the spring energy accumulator (131) upon the use of the gripping device (10) shown in FIGS. 2 to 7 as an internal gripping device. In this state, the third rolling bearing (113) is at a distance from the support flange (118).

The gripping of an item (1) to be gripped by means of an internal gripping device is effected in the same way as the gripping of an item (1) to be gripped by means of an external gripping device, except for the direction of movement of the components. After the engagement of the holding brake (81), the drive motor (71) can be deactivated in this case as well. If the item (1) to be gripped deforms elastically or plastically under the effect of the contact force, the gripping force is built up again in this case as well by means of switching the drive motor (71) on again.

Instead of a combined spring energy accumulator (131) for internal and external gripping, two spring energy accumulators (131) can also be used. The first of these spring energy accumulators is then loaded upon reaching the provided gripping force upon external gripping. In this case, the other spring energy accumulator, which is arranged at the other end of the screw (121), for example, is loaded upon the internal gripping of an item (1) to be gripped. The spring energy accumulators (131) can be preloaded in the initial position.

To set down the gripped item (1), the arm of the industrial robot carrying the gripping device (10) is moved to the corresponding location both upon the operation of the gripping device (10) as an external gripping device and upon operation as an internal gripping device. Here, for example, the arm of the industrial robot is lowered until the gripped item (1) rests on a support. The drive motor (71) is now energized to rotate in the opening direction and the holding brake (81) is released, for example by means of energizing the electromagnet. Upon the operation of the drive motor (71), the gripping element carriers (41, 42) are now conveyed in the opening direction by means of the gear unit (100) including the worm gear stage (151).

Figure 10:
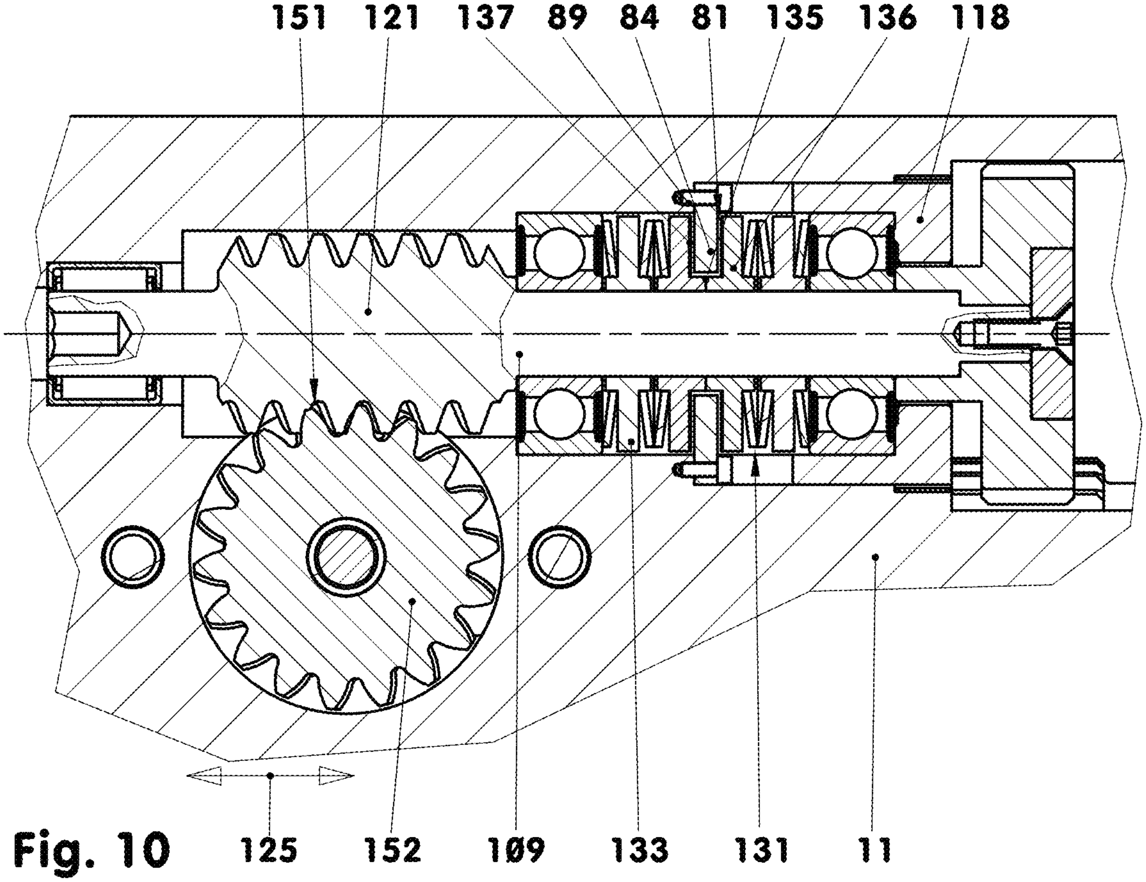
FIG. 10: Gripping device with holding brake on the screw shaft.

FIG. 10 shows an alternative arrangement and structure of the holding brake (81). This is arranged on the third gear shaft (109) and on the housing (11). For example, a ring carrier (135) is arranged between two guide sleeves (133) of the spring energy accumulator (131). In the exemplary embodiment, this is formed in two parts with two abutting ring carrier parts (136). The two ring carrier parts (136), which are, for example, identical to one another, are arranged as mirror images of one another. In each case, a circumferential ring (137) made of a ferromagnetic material is fastened to the surfaces of the ring carrier parts (136) facing one another. It is also conceivable to produce the entire ring carrier part (136) from a ferromagnetic material.

A permanent magnet (84) fastened in the housing (11) is seated between the two rings (137) of the ring carrier parts (136). The permanent magnet (84) is designed to be ring-shaped and surrounds the screw shaft (109). In this exemplary embodiment, the force of the spring energy accumulator (131) is greater than the attraction force of the permanent magnet (84). For example, the gripping device (10) shown in FIG. 10 does not have a brake unit (81) arranged on the first gear shaft (101). It is also conceivable to design the ring (137) as the part of the holding brake (81) that is fixed to the housing and the permanent magnet as the part of the holding brake (81) assigned to the gear shaft (101; 105; 109).

The gripping of an item (1) to be gripped is largely effected as described in connection with the previous exemplary embodiments. Upon the building up of the contact force on the item to be gripped, the screw (121) is slid relative to the housing (11), so that the magnetic field of the permanent magnet (84) blocks the ring (137) and thus the screw (121) in its position. The drive motor (71) can be switched off.

If the item (1) to be gripped deforms elastically or plastically, the spring energy accumulator (131) is also relieved in this exemplary embodiment. The discharging spring energy accumulator (131) slides the screw (121), wherein the distance between the permanent magnet (84) and the ring (137) increases. In this exemplary embodiment, the spring energy accumulator (131) also has the function of the release spring of the holding brake (81). The change in position of the gripping element carriers (41, 42) determined directly or indirectly by the position measuring system (46)

or the angle measuring system also leads to the drive motor (71) being switched on again in this exemplary embodiment. In this case as well, the drive motor (71) is energized again until the preset threshold value of the motor-current-monitoring system (67) responds.

Upon the opening of the gripping device (10), the gear (100) rotates in the opposite direction. The respective gripping pressure flank (122; 123) of the screw (121) detaches from the flank of the screw gear (152). Thereby, the distance between the ring (137) and the permanent magnet (84) is increased. The holding brake (81) is released. The gripping device (10) can now move to its open initial position.

Instead of an electric drive motor (71), a hydraulic or pneumatic drive motor (71) can also be used. The motor-current-monitoring system (67) is replaced by a pressure-monitoring system for hydraulic or pneumatic drive motors. A pressure threshold value at which the holding brake (81) engages is then stored in the gripper controller.

Combinations of the individual exemplary embodiments are also conceivable.

LIST OF REFERENCE SIGNS

1 Item to be gripped
10 Gripping device
11 Housing
12 Housing base
13 Housing cover
14 Housing cover
15 Countersunk screws
16 Lower side of (11)
17 Guide groove
18 Guide groove
19 Stop screw
21 Outer side of (11)
22 Cooling fins
25 Longitudinal direction
26 Engagement direction
31 Electronics mounting space
32 Gear unit mounting space
33 Synchronizing gear holder
34 Media connection
35 Sensor unit
36 Cylindrical recess in (31)
38 Screw shaft recess
39 Base of (38)
41 Gripper element carrier, gripper carriage
42 Gripper element carrier, gripper carriage
43 Toothing
44 Fastening holes
45 Longitudinal groove
46 Position measuring system
47 Coded tape
51 Gripping element, gripper jaw
52 Gripping element, gripper jaw
53 Gripper arm
54 Gripping surface
61 Circuit board, first circuit board
62 Computer and memory module
63 LEDs
64 Circuit board, second circuit board
65 Servo controller
66 Circuit board, third circuit board
67 Motor-current-monitoring system
71 Drive motor
72 Motor shaft
73 Motor shield
74 Fastening screws
75 Rotary encoder
81 Brake unit, holding brake
82 Brake housing
84 Permanent magnet
89 Anti-rotation lock, locking flange
100 Gear unit
101 First gear shaft
102 Drive pinion
103 First gear stage, spur gear stage
104 Counter gear of (103)
105 Intermediate shaft, second gear shaft
106 Intermediate pinion
107 Output gear
108 Second gear stage, spur gear stage
109 Screw shaft, gear shaft
111 Rolling bearing, first rolling bearing
112 Rolling bearing, second rolling bearing
113 Rolling bearing, third rolling bearing
114 Inner ring of (111)
115 Outer ring of (112)
117 Outer ring of (113)
118 Support flange
119 Shaft end of (109)
121 Screw
122 Flank of (121), gripping pressure flank for external gripping
123 Flank of (121), gripping pressure flank for internal gripping
124 Screw rotation axis
125 Axial direction of (121)
131 Spring energy accumulator
132 Disk springs
133 Guide sleeve
134 Disk spring assembly
135 Ring carrier
136 Ring carrier parts
137 Ring, circumferential
141 Pressure disk
142 Hexagon socket screw
151 Worm gear stage
152 Screw gear
153 Synchronizing gear unit
154 Synchronizing gear
155 Synchronizing gear axis
156 Rolling bearing

The invention claimed is:

1. A gripping device, comprising:
a housing (11); and arranged therein
a drive motor (71);
a motor-current-monitoring system (67) or pressure-monitoring system;
a gear unit (100) operatively connected to the drive motor (71), the gear unit (100) having
a worm gear stage (151) driven by
at least one rotatable gear shaft (101; 105; 109), the worm gear stage being coupled to
at least one of at least two gripping element carriers (41; 42) which are movable relative to one another; and
a holding brake (81) of the gripping device (10) for blocking the at least one rotatable gear shaft (101; 105; 109),
wherein the worm gear stage (151) comprises
a screw (121) formed on or arranged on a screw shaft (109) of the at least one rotatable gear shaft (101; 105; 109), and a screw gear (152) meshing with the screw (121), wherein an output gear (107) is mounted on an end of the screw shaft (109) and is operatively connected to the drive motor (71), and wherein a spring energy accumulator (131) is disposed on the screw shaft (109) between the output gear (107) and the screw (121), whereby the spring energy accumulator (131) axially biases the screw (121), so as to drive the screw gear (152) in a gripping direction.

2. The gripping device (10) according to claim 1, wherein the gear unit (100) comprises at least one spur gear stage (103; 108).

3. The gripping device (10) according to claim 1, wherein a screw shaft (109) of the screw (121) carries a straight-toothed output gear (107) of the gear unit (100), which meshes with a further straight-toothed intermediate pinion (106) of the gear unit (100).

4. The gripping device (10) according to claim 1, wherein a screw shaft (109) of the screw (121) carries a disk spring assembly (134) as the spring energy accumulator (131).

5. The gripping device (10) according to claim 1, wherein the screw (121) consists of a thermoplastic material.

6. The gripping device (10) according to claim 1, further comprising either a position measuring system (46) that is arranged, on one side, on the housing (11) and, on another side, on the screw (121) or on a gripping element carrier (41; 42), or an angle measuring system that is arranged on the housing (11) and on a synchronizing gear unit (153) having a screw gear (152) meshing with the screw (121).

7. The gripping device (10) according to claim 6, wherein the position measuring system (46) has a magnetically coded tape arranged on the gripping element carrier (41; 42).

8. The gripping device according to claim 1, wherein the holding brake (81) has a first part fixed to the housing and a second part assigned to the at least one rotatable gear shaft (101; 105; 109) along with a spring element loading both parts, wherein one of the first part or the second part has a permanent magnet (84) and another one of the first part or the second part has a ring (137) made of a ferromagnetic material, and wherein a force of the spring element is directed in an opposite direction to an adhesion force of the permanent magnet (84).

9. A method for operating the gripping device (10) according to claim 1 with gripping elements (51; 52) arranged on the at least two gripping element carriers (41; 42) and with an item (1) to be gripped, comprising:

pressing the at least two gripping elements (51, 52) against the item (1) to be gripped by the gripping device (10) with the holding brake (81) released until the motor-current-monitoring system (67) or the pressure-monitoring system reaches a predetermined value;

increasing a flank pressure of a gripping pressure flank (122; 123) of the screw (121) and sliding the screw (121) in an axial direction (125) under load of the spring energy accumulator (131);

engaging the holding brake (81); and switching the drive motor (71) off.

10. The method according to claim 9, further comprising:

determining, upon the engaging of the holding brake (81), a position of the screw (121), a synchronizing gear unit (153) or at least one gripping element carrier (41, 42) relative to the housing (11) by a position measuring system (46) or an angle measuring system, wherein, upon a reduction of a contact resistance of the at least two gripping elements (51, 52) on the item (1) to be gripped, the spring energy accumulator (131) slides the screw (121) in the axial direction (125) while increasing an edge pressure of the gripping pressure flank (122; 123), and wherein, if a difference to the position as previously determined is detected by the position measuring system (46) or the angle measuring system, the drive motor (71) is switched on and the holding brake (81) is released until the motor-current-monitoring system (67) or the pressure-monitoring system reaches the predetermined value.

11. The gripping device (10) according to claim 1, wherein the holding brake (81) is configured to engage upon the motor-current-monitoring system (67) or the pressure-monitoring system reaching a predetermined value.

12. The gripping device (10) according to claim 1, wherein the housing (11) comprises a housing base body (12) and housing covers (13, 14) that delimit an electronics mounting space (31) for the drive motor (71) and a gear unit mounting space (32) for the gear unit (100) and the holding brake (81).

13. The gripping device (10) according to claim 11, further comprising at least two gripping elements (51, 52) respectively fastened to gripping element carriers (41, 42), wherein the gripping element carriers (41, 42) are guided in guide grooves (17, 18) formed on the housing (11) and are movable relative to one another for gripping an item.

* * * * *